US012767320B2

(12) United States Patent
Harrison et al.

(10) Patent No.: US 12,767,320 B2
(45) Date of Patent: Oct. 20, 2026

(54) ATTACHMENT FOR ROTARY ACTUATOR

(71) Applicant: Goodrich Actuation Systems Limited, Solihull (GB)

(72) Inventors: Colin Harrison, Wolverhampton (GB); Jonathan Darby, Newcastle (GB)

(73) Assignee: Goodrich Actuation Systems Limited, Solihull (GB)

( * ) Notice: Subject to any disclaimer, the term of this patent is extended or adjusted under 35 U.S.C. 154(b) by 229 days.

(21) Appl. No.: 17/988,273

(22) Filed: Nov. 16, 2022

(65) Prior Publication Data

US 2023/0150652 A1 May 18, 2023

(30) Foreign Application Priority Data

Nov. 16, 2021 (EP) .................................... 21275158

(51) Int. Cl.
*B64C 13/34* (2006.01)
*B64C 9/02* (2006.01)

(52) U.S. Cl.
CPC ................ *B64C 13/34* (2013.01); *B64C 9/02* (2013.01)

(58) Field of Classification Search
CPC B64C 9/02; B64C 13/28; B64C 13/34; F16H 1/22
See application file for complete search history.

(56) References Cited

U.S. PATENT DOCUMENTS 5,518,466 A 5/1996 Tiedeman
5,558,299 A 9/1996 Veile
8,291,782 B1 * 10/2012 Shaheen ............. F16H 25/2472 74/89.34
9,643,716 B2 5/2017 Sheahan, Jr. et al.
10,583,911 B2 3/2020 Lorenz et al.
10,927,899 B2 2/2021 Janakiraman et al.
11,066,148 B2 7/2021 Elenbaas et al.
2015/0274280 A1 * 10/2015 Sheahan, Jr. ........... B64C 13/26 244/99.2

(Continued)

FOREIGN PATENT DOCUMENTS

DE 102014007266 A1 11/2015
EP 1475305 A2 11/2004

(Continued)

OTHER PUBLICATIONS

European Search Report for Application No. 21275158.0, mailed Apr. 21, 2022, 8 pages.

*Primary Examiner* — Joshua D Huson
(74) *Attorney, Agent, or Firm* — Kilpatrick Townsend & Stockton LLP

(57) ABSTRACT

A rotary actuator assembly for moving a first relatively movable part relative to a second relatively movable part. The assembly includes a rotary actuator having a plurality of circumferential earth members for attachment to one of the first and the second relatively movable parts and a plurality of circumferential output members for attachment to the other of the first and second relatively movable parts. At least the plurality of circumferential earth members or the plurality of circumferential output members is provided with radially outwardly extending locking features around their circumference configured to be received in a mounting sleeve having complementary locking features to engage with the radially outwardly extending locking features.

9 Claims, 2 Drawing Sheets

(56) References Cited

U.S. PATENT DOCUMENTS

| | | | | |
|---|---|---|---|---|
| 2016/0016653 | A1* | 1/2016 | Barger | B64C 13/28 192/223 |
| 2021/0031902 | A1 | 2/2021 | Lorenz | |
| 2021/0061443 | A1* | 3/2021 | Dahl | B64C 9/04 |

FOREIGN PATENT DOCUMENTS

| | | | |
|---|---|---|---|
| EP | 1475305 | A3 | 4/2006 |
| EP | 3032725 | A1 | 6/2016 |
| GB | 2554882 | A | 10/2016 |
| WO | 2015172869 | A1 | 11/2015 |

* cited by examiner

ATTACHMENT FOR ROTARY ACTUATOR

CROSS-REFERENCE TO RELATED APPLICATIONS

This application claims priority to European Patent Application No. 21275158.0 filed Nov. 16, 2021, the entire contents of which is incorporated herein by reference.

TECHNICAL FIELD

The present disclosure is concerned with means for mounting or attaching a rotary actuator to a wing assembly of an aircraft.

BACKGROUND

Modern aircraft include a number of movable surface or panels such as flight control surface of wing tips that are configured to be movable relative to another part of the aircraft e.g. to another, fixed or stationary part of a wing. The movable parts are typically moved relative to the stationary part by means of an actuator. In applications where it is important to minimise weight and size of parts on an aircraft, rotary actuators are used comprising a fixed stator part and a movable rotor part. Rotary geared actuators (RGAs) have been developed in which the input and the output are linked by a series of gears to step down high speed, low torque rotation to provide slower speed, high torque positioning of a movable part. These actuators are typically positioned along the hinge line between a stationary part of the structure e.g. wing, and a relatively rotatable part. The RGA has so called earth members for fixing the actuator to one of the parts and output members for attachment to the other part. Typically, the earth members are attached to the stationary part of the structure and are mounted via flanges and bolts. The output members are then attached to the movable part also by known attachment means such as bolts or the like.

The attachment lugs and mounts required to attach the earth members to the wing structure and to attach the output members to the moveable part (or vice versa) add to the overall size and weight of the actuator assembly and the envelope required to accommodate the assembly. Where space and weight allowance is limited. Such as in aircraft, there is a desire to reduce the size and weight of mounting/attachment components whilst maintaining the required secure attachment.

In addition, attaching an RGA to the structure is generally time and labour intensive and as each lug/fixing mechanism needs to be fastened securely by hand, there is a risk of human error each time.

Furthermore, each attachment point where a lug or the like is fastened to the structure, is subject to loads that cause local stresses particularly during flight and during operation that can loosen or damage the fastening.

There is, therefore, a need for an improved way of securing an RGA to a structure whilst maintaining secure attachment.

SUMMARY

According to the present disclosure, there is provided a rotary actuator assembly for moving a first relatively movable part relative to a second relatively movable part, the assembly comprising a rotary actuator having a plurality of circumferential earth members for attachment to one of the first and the second relatively movable parts and a plurality of circumferential output members for attachment to the other of the first and second relatively movable parts, and wherein at least the plurality of circumferential earth members or the plurality of circumferential output members is provided with radially outwardly extending locking features e.g. splines around their circumference configured to be received in a mounting sleeve having complementary splines to engage with the radially extending splines.

In some examples, both the plurality of circumferential earth members and the plurality of circumferential output members are provided with such radially extending splines.

In another aspect, there is provided a mounting assembly comprising a rotary actuator assembly as described above and a mounting sleeve having a plurality of radially inwardly extending circumferential splines positioned along the length of the sleeve so as to engage with the radially outwardly extending splines of the rotary actuator assembly when inserted in the mounting sleeve.

BRIEF DESCRIPTION

DETAILED DESCRIPTION

Figure 1:
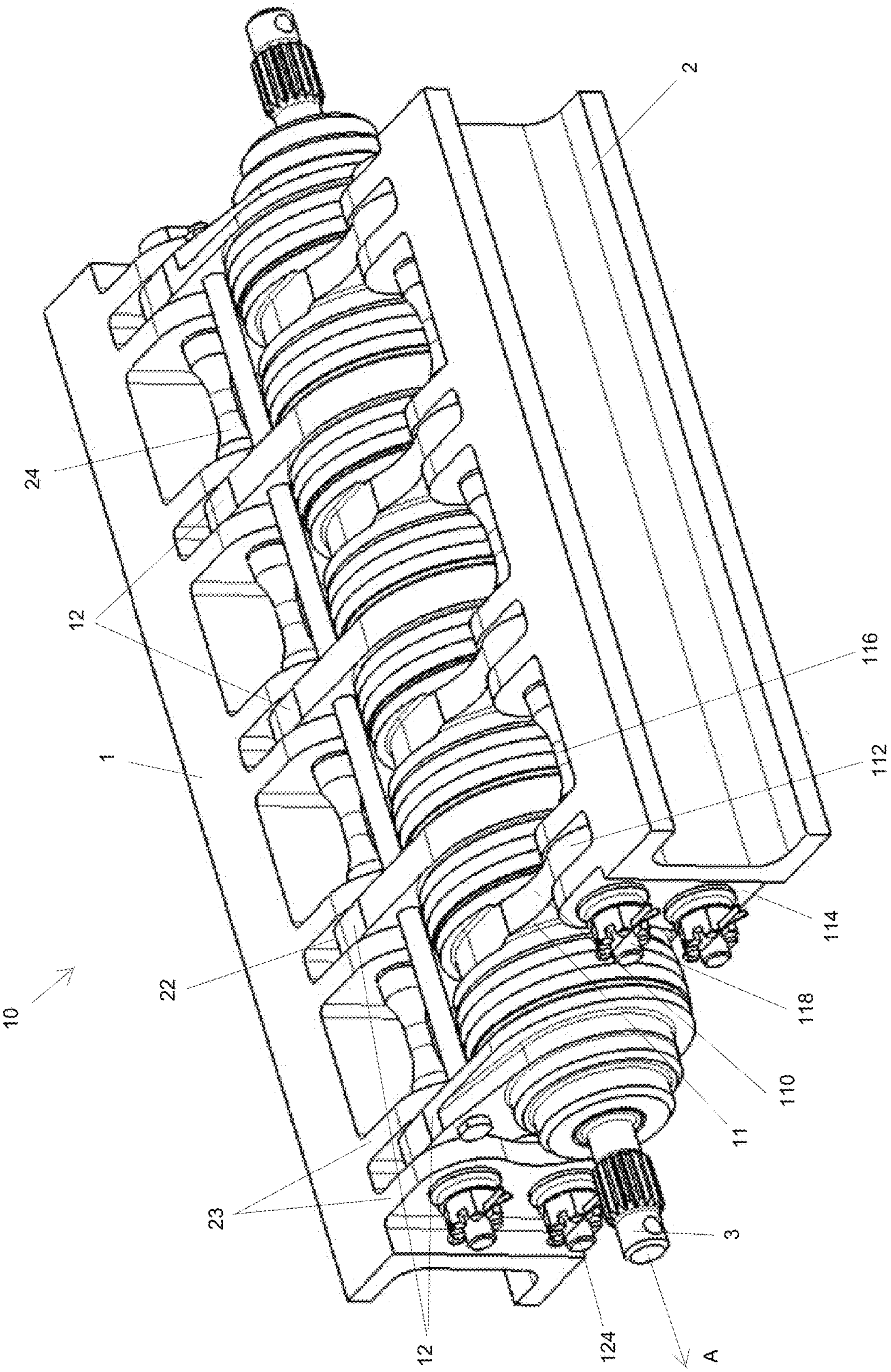
FIG. 1 Prior Art
FIG. 1 shows a typical rotary actuator with a conventional attachment mechanism.

FIG. 1 shows a rotary actuator 10 positioned between and attached to two relatively moveable parts 1,2. Such as, but not limited to, a fixed wing structure 1 and a relatively movable part 2 e.g. a slat or flap or a foldable wing tip. The actuator can be any known type of rotary actuator having a stator part and a rotor part. Input rotation is provided to the actuator by a drive means such as a motor (not shown) that drives an input shaft 3. This causes rotation of the gears (not shown in detail) of the actuator which result in rotation of the rotor 11. The rotor 11 is fixed to the second relatively movable part 2. The actuator operation is known in the art and will not be described in any detail. The drawing is schematic only. Different types of rotary actuator are possible. With a geared actuator, as shown, the gears of the actuator operate such that the output rotor 11 rotates in response to, but at a different speed to the input rotation to cause relative rotation of the other part 2, to which the output rotor 11 is attached.

The rotary actuator extends axially along an axis A defined by the shaft 3 and the gears, earth members 12 and rotor 11 are arranged around the axis such that the rotor rotates about the axis. The earth members 12 are annular or circumferential rings mounted around the shaft 3 and several earth members 12 may be positioned around the actuator spaced apart in the axial direction. The number of earth members can be selected according to the use and design requirements of the actuator.

In a conventional arrangement, the actuator is mounted to the first relatively moveable part 1 via earth members 12 on the actuator. The earth members around the body of the actuator are secured to the wing part 1 in any known way by a fixed fastener such as a bolt attached to the earth member by an external housing (not shown). In the example shown, the earth members 12 are formed with radially extending lugs 22 with a hole therethrough. The lugs fit into attachment mounts 23 provided on the relatively movable part 1 which also have holes therethrough. The earth members are secured in positioned by passing a bolt 24 through the holes in the attachment mounts and the lugs. Each earth member may be provided with several lugs (two are shown for each earth member in the example of FIG. 1) and two bolts. A single bolt or rod can be passed through the whole row of earth members and secured by a fastener 124 at each end. It is also feasible that each lug and attachment mount pair could be fastened with a separate fastener.

Outlet members 110 are mounted around, and rotate with the rotor 11. The outlet members 110 may be provided at locations along the length of the actuator between earth members 12 but, again, the number and spacing of the outlet members will depend on specific design requirements. The outlet members 110 are arranged to be attached to the other of the relatively movable parts 2. As with the earth members 12, typically, the outlet members are provided with lugs 112 with holes therethrough which fit between mounting attachments 114 affixed to the second relatively movable part and one or more bolts 116 is passed through the matched-up holes to secure the outlet members to the relatively movable part. The bolts 116 can be secured by fasteners 118 either at each lug location or a single bolt passes through all lugs and is secured at its ends.

In this way, the earth members, which do not rotate with the actuator rotor, are fixed to one part of, say, the wing, and the relatively rotatable output members, that rotate with the actuator rotor 11, are attached to move the other part of the wing to rotate it relative to the first part.

As mentioned above, and as can be seen from FIG. 1, although the earth members, output members, lugs, attachment mounts and bolts do not actually contribute to the actuator function, they add substantially to required space envelope and to the overall weight of the assembly.

Figure 2:
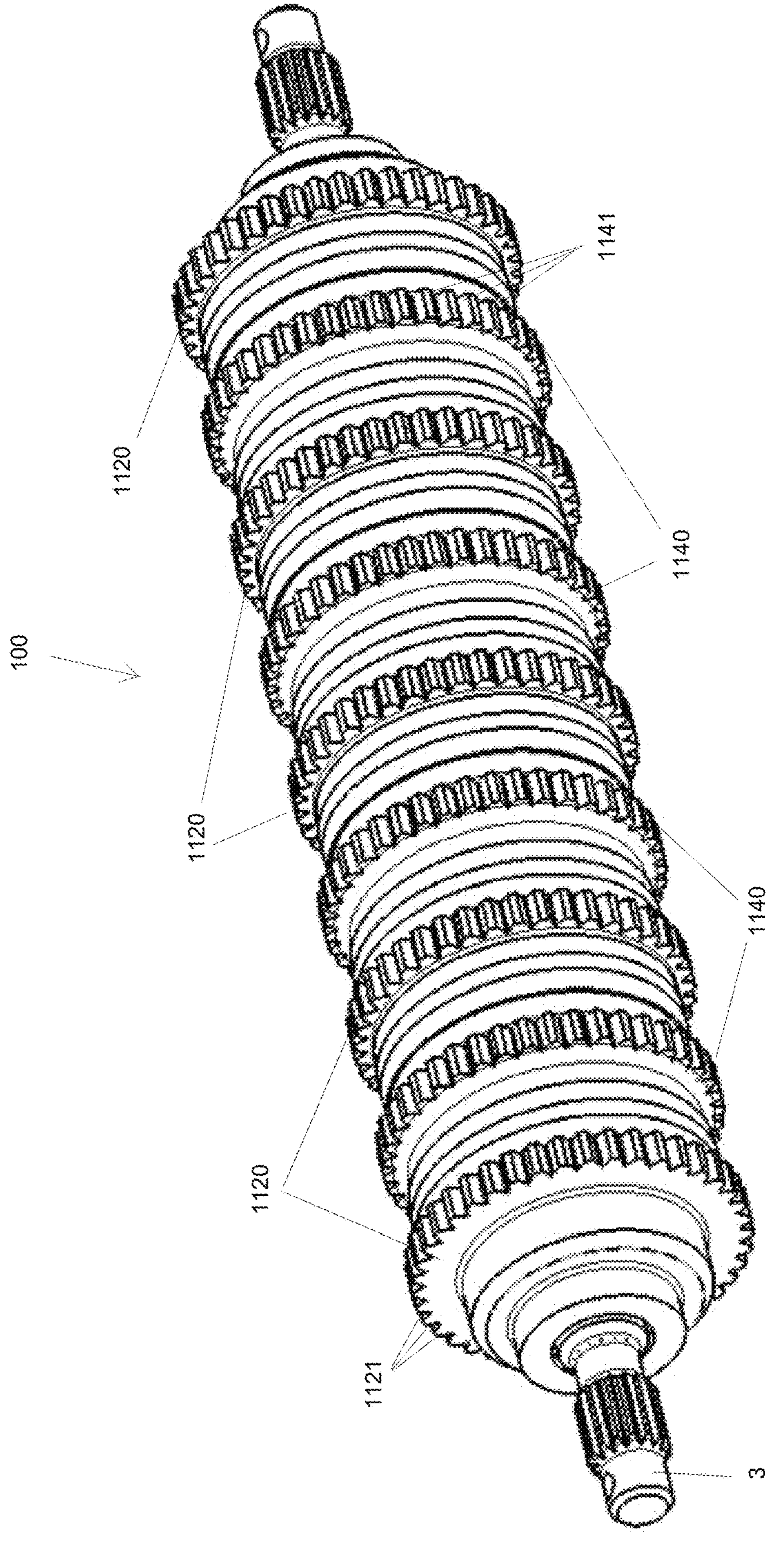
FIG. 2 shows an example of the rotary actuator assembly according to the present disclosure.

In the assembly according to this disclosure, an example of which is shown in FIG. 2, the mounting of the actuator with respect to the relatively movable parts, is by means of circumferential splines around the actuator instead of radially extending lugs and mounts and bolts therethough. This greatly simplifies assembling the actuator and also takes up less space and has reduced weight compared to the assembly shown in FIG. 1.

The general structure and function of the rotary actuator according to the disclosure is as described above and will not be described again herein. The difference lies in the way the actuator 100 is attached to the relatively moveable parts e.g. the wing parts.

Instead of the earth members having lugs, the earth members 1120 of the disclosure are provided with radially extending locking features e.g. splines 1121 around the circumference of the annular ring forming the earth member, the splines extending radially outwards. The splines 1121 are configured to engage with complementary splines (not shown) extending inwardly from a socket or sleeve (not shown) formed on the first relatively movable part e.g. the fixed wing part. Instead of splines, the locking features may take other forms that engage to provide the desired locking between the earth members and the receiving sleeve.

Similarly, the output members 1140 may be provided with similar splines 1141 around their circumference with will engage with complementary splines formed in a sleeve part provided on the other relatively movable part e.g. a movable wing panel.

In the example shown, all of the earth members 1120 and the output members 1140 are provided with splines. In other examples, though, it may be that only some of the earth members and/or output members are provided with splines. For example, only the earth members might have a spline fitting with one wing part, while the output members have a conventional lug/mount fitting, or vice versa.

A sleeve for receiving the actuator will be defined by sleeve parts formed on or attached to the adjacent edges of the relatively movable parts i.e. the resulting sleeve formed by the sleeve parts will define the hinge between the two parts and will have inwardly extending splines. The actuator can then be pushed into the sleeve for assembly such that the splines on the earth members 1120 will engage with splines of the sleeve part attached to a fixed structure part and the splines on the output members will engage with splines on the other part of the sleeve that is affixed to the other part.

Once inserted in the sleeve, the actuator can be locked axially in position by any suitable means e.g. bolts, locking rings, caps etc.

Attaching the actuator to the relatively movable parts in this way allows the actuator to be easily mounted but ensures a secure attachment and reliable rotation operation. The fastening components have reduced size and weight compared to known mounting assemblies and spread the stress locations around the rings rather than providing single stress points at the lugs.

The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A rotary actuator assembly for moving a first relatively movable part relative to a second relatively movable part, the assembly comprising:
- a rotary actuator comprising:
  - a drive shaft having:
  - a plurality of circumferential earth members extending from the drive shaft for attachment to one of the first and the second relatively movable parts; and
  - a plurality of circumferential output members fixed to and extending from the drive shaft for attachment to the other of the first and second relatively movable parts;
  - wherein the plurality of circumferential earth members and the plurality of circumferential output members are both provided with radially outwardly extending locking features around their circumference configured to be received in a mounting sleeve having complementary locking features to engage with the radially outwardly extending locking features of the plurality of circumferential earth members and the plurality of circumferential output members assembly when inserted in the mounting sleeve.

2. The assembly of claim 1, wherein both the plurality of circumferential earth members and the plurality of circumferential output members are provided with such radially outwardly extending locking features around their circumference.

3. The assembly of claim 1, wherein each circumferential output member is arranged in the axial direction of the actuator, between two earth members.

4. The assembly of claim 1, wherein the rotary actuator comprises a stator and a rotor rotatable about an input shaft.

5. The assembly of claim 4, wherein the earth members are attached to the stator and the output members are attached to and rotatable with the rotor.

6. The assembly of claim 1, wherein the rotary actuator is a rotary geared actuator.

7. The assembly of claim 1, wherein the locking features comprise splines.

8. A method of attaching a rotary actuator assembly as claimed in claim 1 to first and second relatively movable parts to rotate one of the relatively movable parts relative to the other, comprising:

inserting the rotary actuator assembly into a mounting assembly, wherein the mounting assembly includes the mounting sleeve.

9. The method of claim 8, further comprising:

securing the rotary actuator assembly axially in position in the mounting sleeve.

* * * * *